United States Patent [19]
Ohashi et al.

[11] Patent Number: 5,647,674
[45] Date of Patent: Jul. 15, 1997

[54] RETAINER FOR NEEDLE ROLLER BEARING

[75] Inventors: Izumi Ohashi; Atsushi Yamashita, both of Fukuroi, Japan

[73] Assignee: NTN Corporation, Osaka, Japan

[21] Appl. No.: 642,618

[22] Filed: May 3, 1996

[30] Foreign Application Priority Data

May 16, 1995 [JP] Japan ................... 7-117393

[51] Int. Cl.⁶ .................................................. F16C 33/46
[52] U.S. Cl. .................................... 384/580; 384/575
[58] Field of Search ............................. 384/572, 575, 384/576, 580

[56] References Cited

U.S. PATENT DOCUMENTS

| | | | |
|---|---|---|---|
| 3,307,892 | 3/1967 | Eckstein | 384/572 |
| 3,582,165 | 6/1971 | Koch | 384/580 |
| 3,586,406 | 6/1971 | Barr | 384/580 |
| 4,797,015 | 1/1989 | Hidano et al. | 384/580 |
| 5,172,986 | 12/1992 | Yokota | 384/580 |

FOREIGN PATENT DOCUMENTS

| | | | |
|---|---|---|---|
| 541554 | 8/1959 | Belgium | 384/580 |
| 1001550 | 1/1957 | Germany | 384/572 |

*Primary Examiner*—Thomas R. Hannon
*Attorney, Agent, or Firm*—Wenderoth, Lind & Ponack

[57] ABSTRACT

A retainer for a needle roller bearing which can prevent a film of lubricating oil from being broken due to its needle roller retaining claws and thus prevent peeling of the needle rollers. Outer-diameter claws and inner-diameter claws are provided on roller guiding surfaces on both sides of each crossbar portion of the retainer to retain the needle rollers in pockets defined between the adjacent crossbars. In the case of an outer-diameter guide type retainer, the outer-diameter claws are provided at a stepped portion formed on the outer-diameter surface of each crossbar. In the case of an inner-diameter guide type retainer, the inner-diameter claws are provided at a stepped portion formed on the inner-diameter surface of each crossbar.

2 Claims, 9 Drawing Sheets

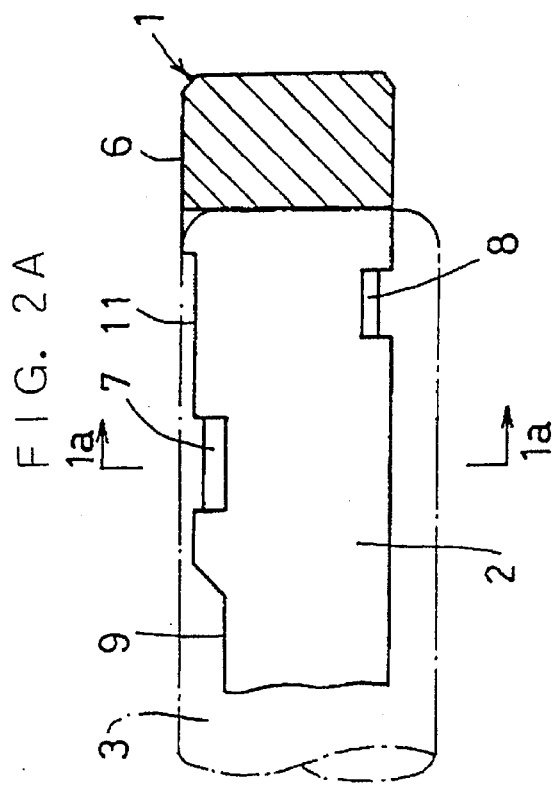
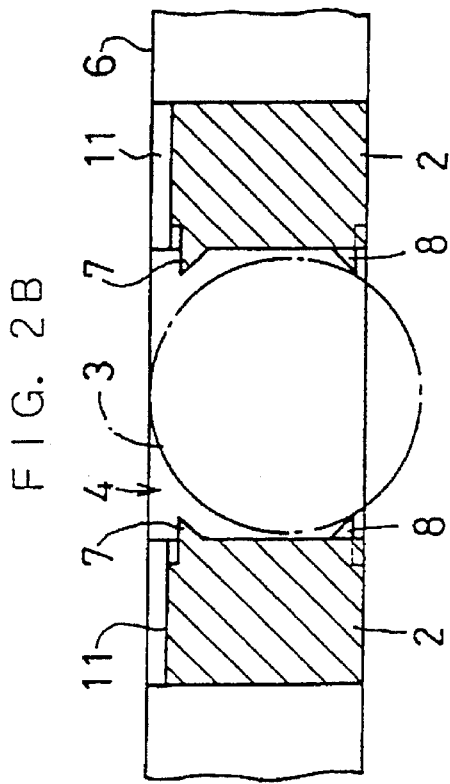
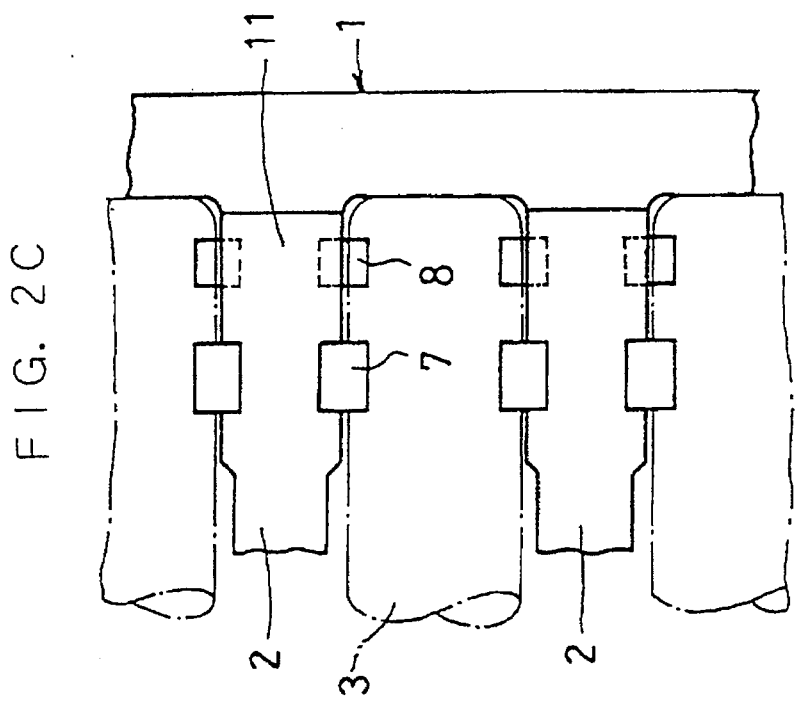

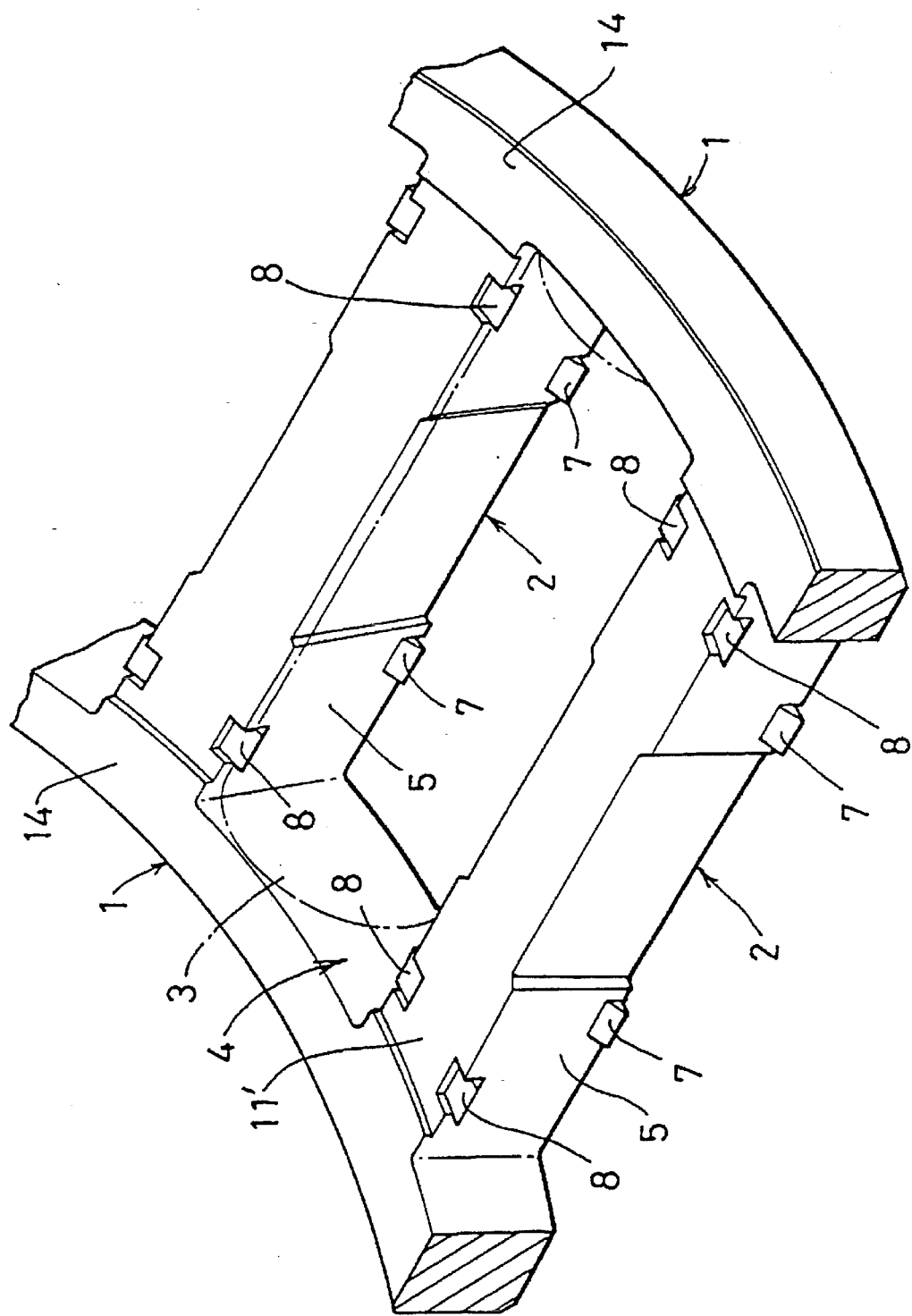

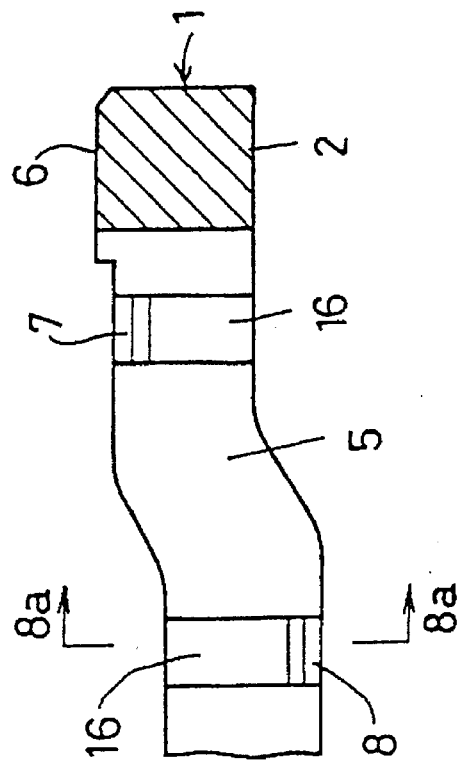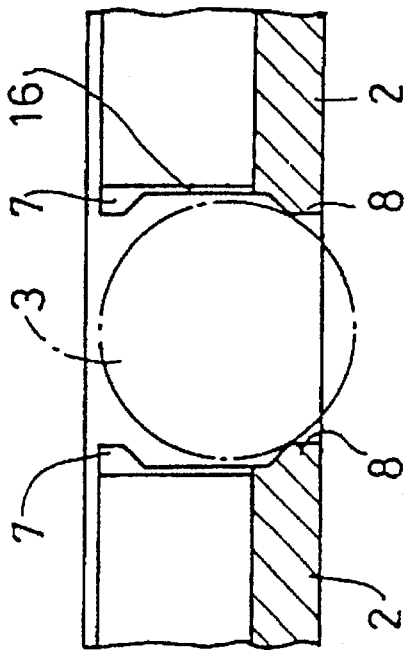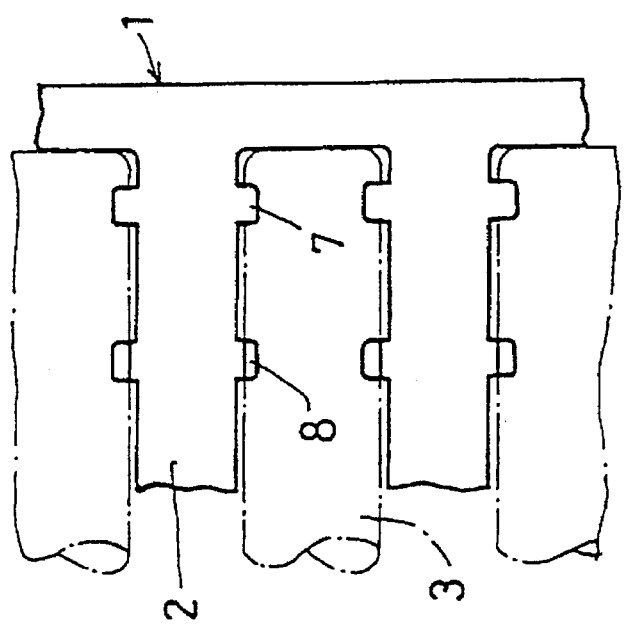

1

RETAINER FOR NEEDLE ROLLER BEARING

BACKGROUND OF THE INVENTION

The present invention relates to a retainer for a needle roller bearing.

FIG. 9 shows a conventional outer-diameter guide type retainer for a needle roller bearing. It comprises opposite annular portions 1 and a plurality of integral crossbar portions 2 extending between the annular portions 1 and arranged circumferentially at equal intervals. Needle rollers 3 are received in pockets 4 defined between the adjacent crossbars 2. Both sides of the crossbars 2 serve as guide surfaces 5.

The outer surfaces of the annular portions 1 and the crossbar portions 2 are of the same height (or radius) and form outer-diameter guide surfaces 6 for the retainer itself.

Each crossbar has two pairs of outer-diameter claws 7 in its outer peripheral surface, each pair being longitudinally spaced from each other and protruding from each guide surface 5 into the pocket 4. Four pairs of inner-diameter claws 8 similar to the claws 7 are provided in the inner periphery of each crossbar 2 near both ends.

The needle rollers 3 are snap-fitted in the pockets 4 by resiliently deforming the crossbars 2 and are retained in the pockets by the outer-diameter claws 7 and the inner-diameter claws 8.

The claws 7 and 8 are formed by partially caulking, molding or ironing the crossbars 2.

A needle roller bearing having such a retainer is disposed between two relatively rotating members so that its outer-diameter guide surfaces 6 are guided by the outer one of the two relatively rotating members.

In the case of an inner-diameter guide type retainer, the inner peripheral surfaces of the annular portions 1 and the crossbar portions 2 are used as inner-diameter guide surfaces which are guided by the inner rotary member.

The outer-diameter claws and the inner-diameter claws protrude from both sides of each crossbar near its outer-diameter and inner-diameter surfaces. In the case of an outer-diameter guide type retainer, the outer-diameter claws tend to break a film of lubricating oil formed between the retainer and the mating member, or in the case of an inner-diameter guide type retainer, the inner-diameter claws tend to break an oil film. When rollers are brought into contact with mating members at portions where oil films are broken by the inner or outer claws, the rollers tend to suffer peeling at the contact portions.

An object of the present invention is to provide a retainer for a needle roller bearing having inner and outer roller retaining claws arranged so as not to break an oil film formed on the retainer, irrespective of whether the retainer is the outer-diameter guide type or the inner-diameter one.

SUMMARY OF THE INVENTION

According to the present invention, there is provided a retainer for a needle roller bearing comprising an opposed pair of annular portions, and a plurality of crossbar portions extending between the annular portions and arranged circumferentially at equal intervals so as to define pockets for receiving needle rollers between the adjacent crossbars. The crossbar portions have opposite side faces serving as roller guide surfaces and formed with outer-diameter claws and inner-diameter claws on the roller guide surfaces to retain the needle rollers in the pockets. The retainer is an outer-diameter guide type having an outer-diameter guide surface on the outer-diameter surface thereof, and the each crossbar has a stepped portion on the outer-diameter surface thereof, the stepped portion being recessed radially inwardly from the outer-diameter guide surface. The outer-diameter claws are provided at the stepped portion.

Since the outer-diameter claws are provided at the stepped portion which is recessed from the outer-diameter guide surfaces, they are separated from the oil film by the same distance as the stepped portion is separated from the oil film. The outer-diameter claws will not break the oil film. It is thus possible to prevent peeling of the needle rollers.

Similarly, in the case of an inner-diameter guide type retainer, the inner-diameter claws are separated from the oil film by the same distance as the stepped portion is from the oil film, so that they will not break the oil film, either.

Other features and objects of the present invention will become apparent from the following description made with reference to the accompanying drawings, in which:

BRIEF DESCRIPTION OF THE DRAWINGS

FIG. 2A is a partial sectional view of FIG. 1;

FIG. 2B is a sectional view taken along line 1a—1a of FIG. 2A;

FIG. 2C is a plan view of the first embodiment;

FIG. 3 is a partial enlarged perspective view of a second embodiment;

FIG. 8A is a partial sectional view of FIG. 7;

FIG. 8B is a sectional view taken along line 8a—8a of FIG. 8A;

FIG. 8C is a plan view of the fifth embodiment; and

DETAILED DESCRIPTION OF THE PREFERRED EMBODIMENT

Figure 1:
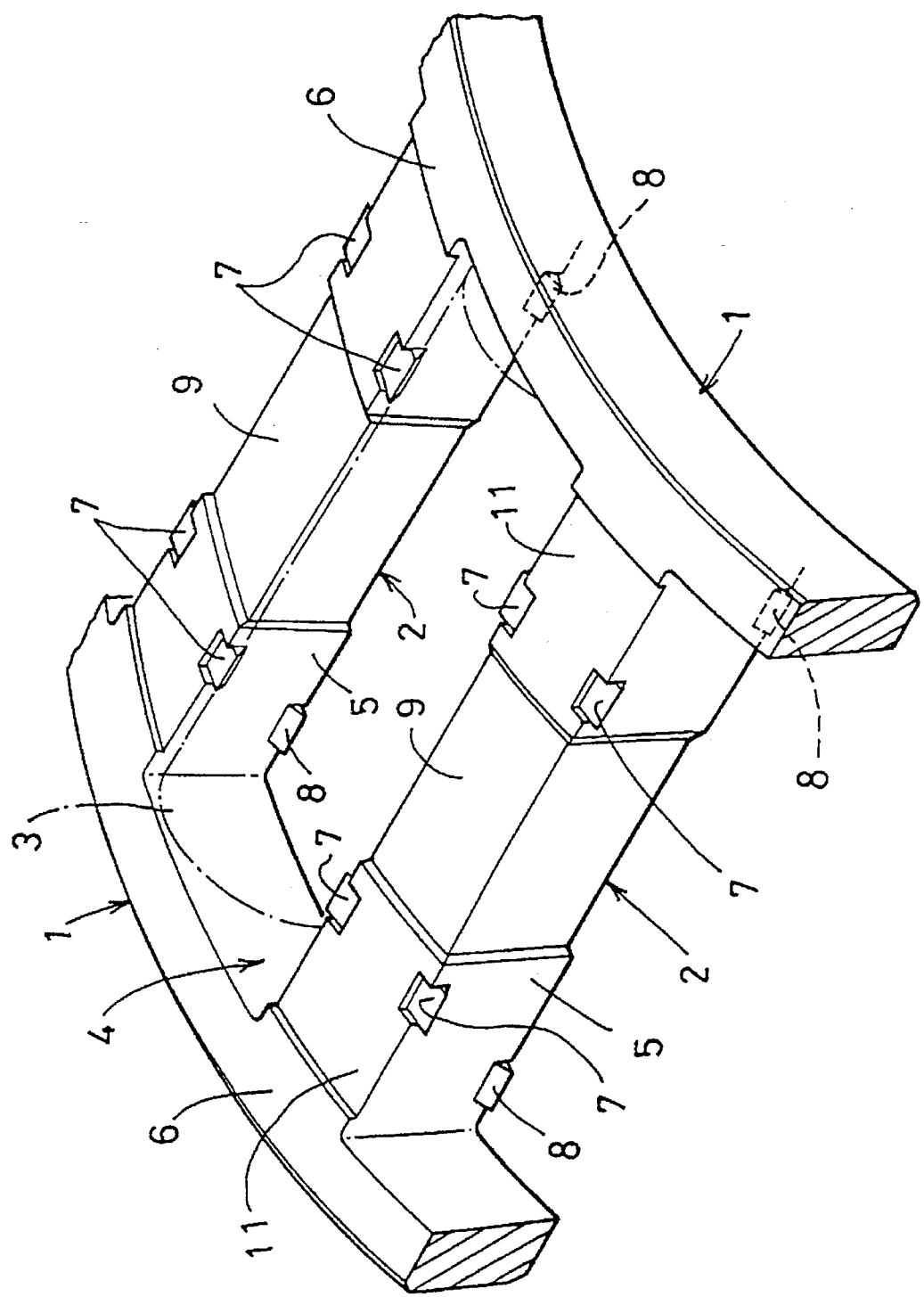
FIG. 1 is a partially enlarged perspective view of a first embodiment.

Both the retainer of the first embodiment shown in FIGS. 1 and 2 and the retainer of the second embodiment shown in FIG. 3 are formed by blanking a steel strip and shaping the blanked members into a cylindrical shape. The former is the outer-diameter guide type, while the latter is the inner-diameter guide type.

The retainer of the first embodiment includes opposite annular portions 1 and a plurality of integral crossbar portions 2 extending between the annular portions 1 and arranged circumferentially at equal intervals. Needle rollers 3 are received in pockets 4 defined between the adjacent crossbars 2. Both sides of the crossbars 2 serve as roller guide surfaces 5.

A pair of outer-diameter guide surfaces 6, having the same diameter, are formed by the outer peripheral surfaces of the annular portions 1 and both ends of the crossbars 2. Each crossbar 2 is further formed with radially inwardly stepped portions 11 which are recessed slightly from the outer-diameter guide surfaces 6 as shown in FIGS. 1 and 2A. A recess 9 is formed between the stepped portions 11.

Outer-diameter claws 7 are formed along both outer side edges of the stepped portions 11 so as to protrude from the roller guide surfaces 5 by use of a caulking tool.

Similarly, inner-diameter claws 8 protruding from the roller guide surfaces 5 are formed along both inner side edges of the stepped portions 11 by use of a caulking tool.

The needle rollers 3 are retained in the pockets 4 by the outer-diameter claws 7 and the inner-diameter claws 8 protruding from the roller guide surfaces 5 on both sides of the pockets 4.

The roller bearing being retained is guided by outer-diameter guide surfaces 6. The outer-diameter claws 7, formed in the stepped portions 11, are retracted from the outer-diameter guide surfaces 6 by the same amount as the stepped portions 11 are retracted from the outer-diameter guide surfaces 6. Thus, they cannot break an oil film.

The retainer of the second embodiment shown in FIG. 3 has inner-diameter guide surfaces 14 on the inner peripheral surfaces of the annular portions 1 and the crossbars 2. Each crossbar 2 is further formed with a pair of radially outwardly recessed stepped portions 11' in its inner periphery near the annular portions 1. The stepped portions are recessed slightly from inner-diameter guide surfaces 14. Inner-diameters claws 8 and outer-diameter claws 7 similar to those of the first embodiment are formed along both inner side edges and both outer side edges of the stepped portions 11', respectively.

The needle rollers 3 are retained in the pockets 4 by the outer-diameter claws 7 and the inner-diameter claws 8 protruding from the roller guide surfaces 5 on both sides of the pockets 4.

The needle roller bearing having this retainer is guided by its inner-diameter guide surfaces 14. The inner-diameter claws 8, formed in the stepped portions 11', are retracted from the inner-diameter guide surfaces 14 by the same amount as the stepped portions 11' are recessed from the inner-diameter guide surfaces 14. Thus, they cannot break an oil film.

Figure 4:
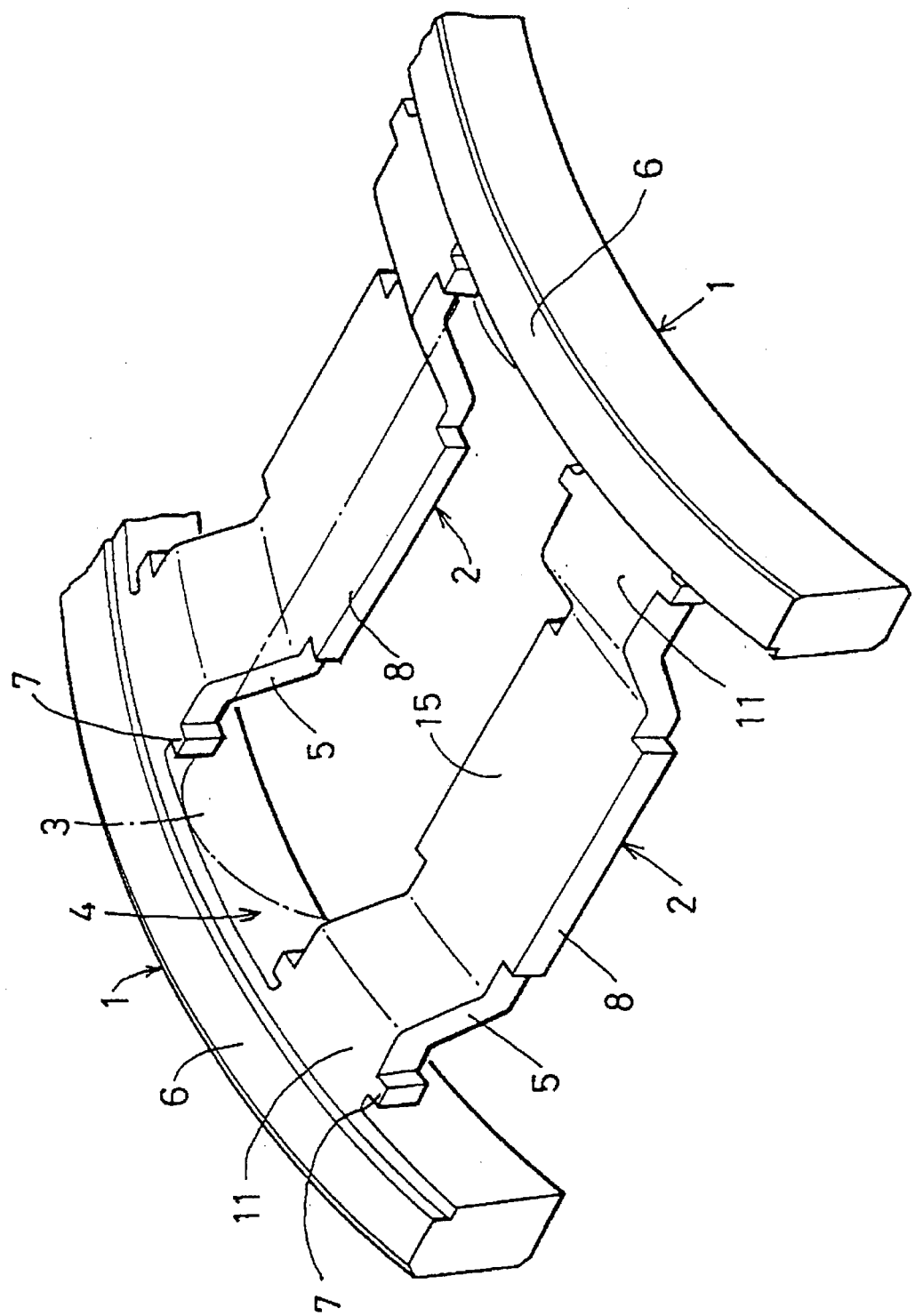
FIG. 4 is a partial enlarged perspective view of a third embodiment.
Figure 5A:
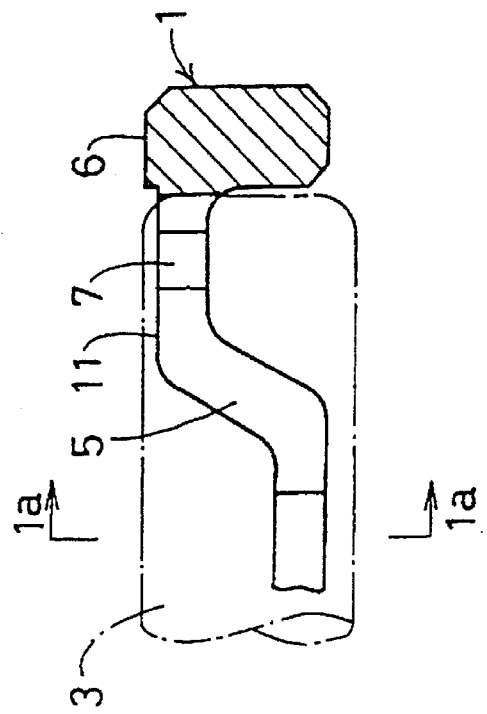
FIG. 5A is a partial sectional view of FIG. 4.
Figure 5B:
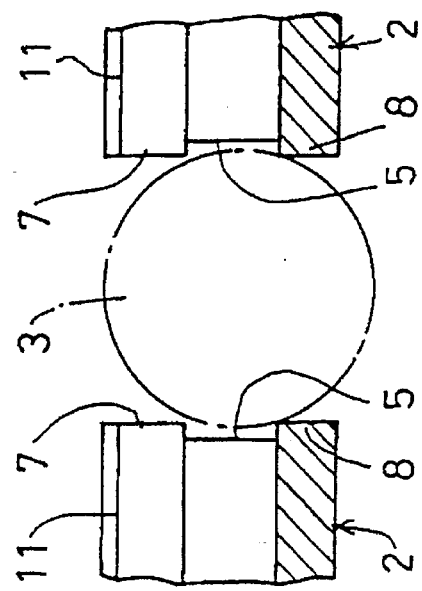
FIG. 5B is a sectional view taken along line 1a—1a of FIG. 5A.
Figure 5C:
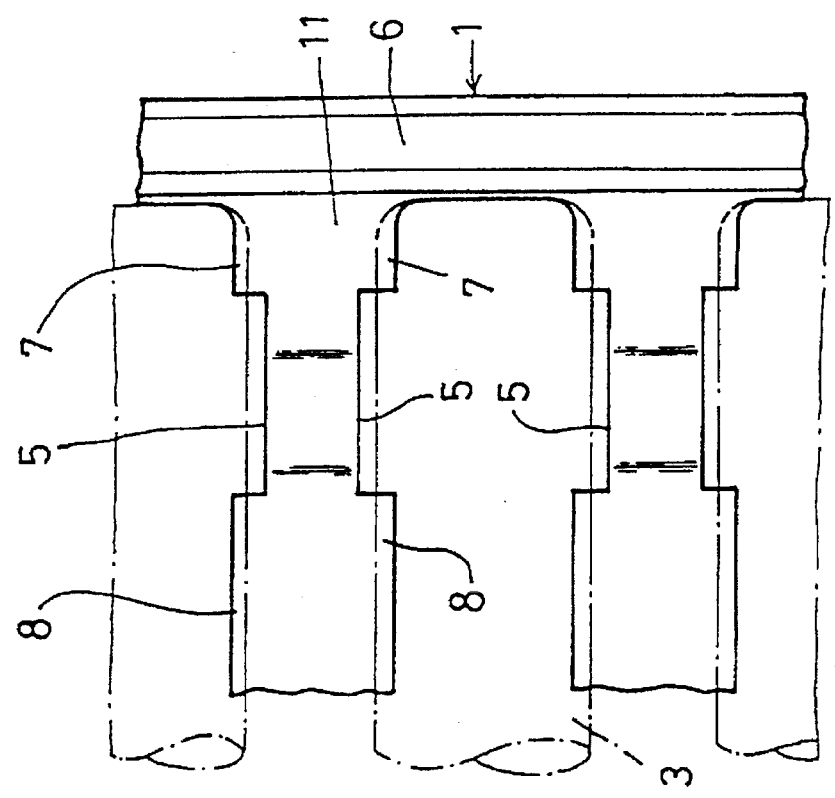
FIG. 5C is a plan view of the third embodiment.
Figure 6:
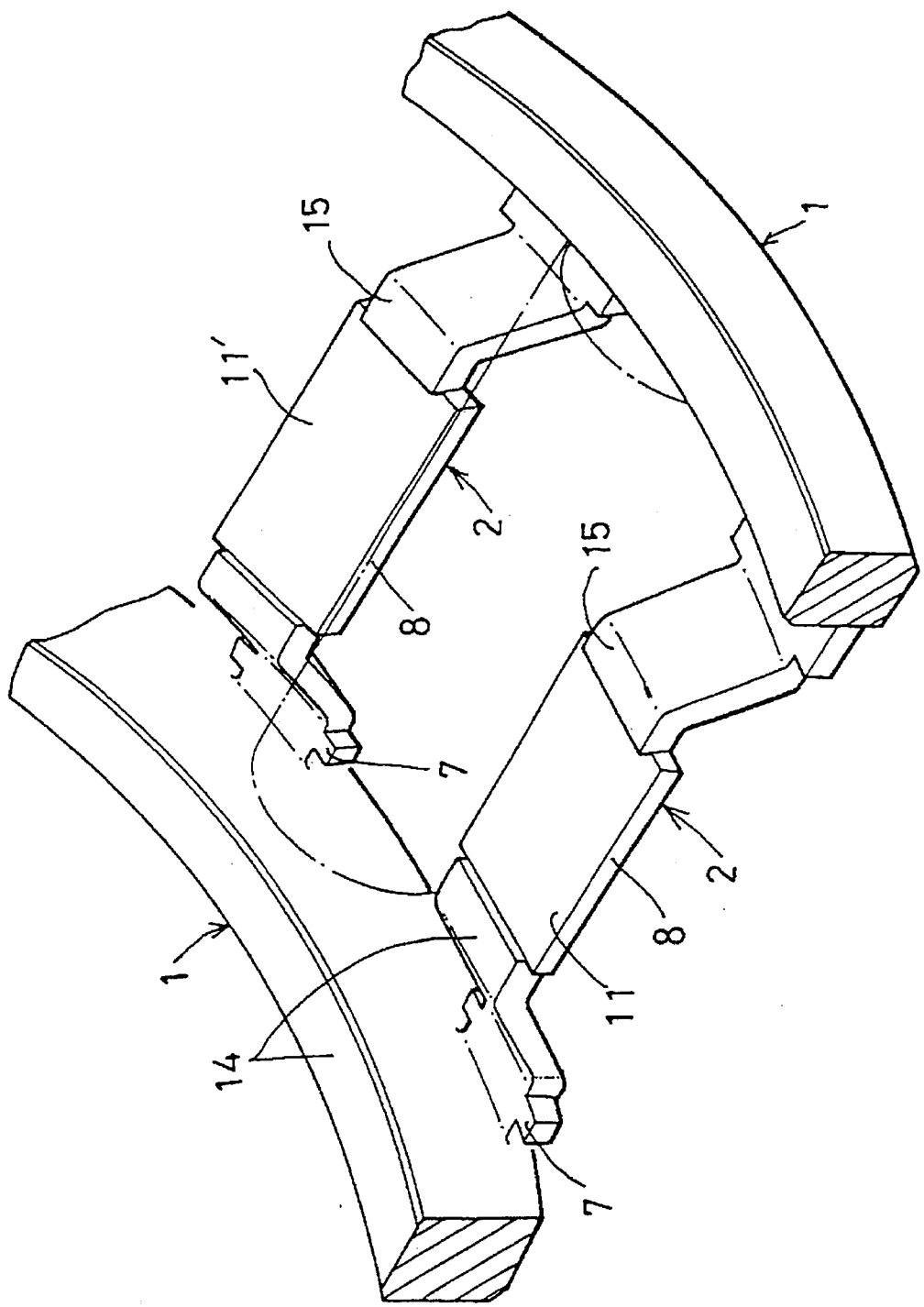
FIG. 6 is a partial enlarged perspective view of a fourth embodiment.

The cages of the third embodiment shown in FIGS. 4 and 5 and the fourth embodiment shown in FIG. 6 are integrally molded from a sintered alloy. The third embodiment is the outer-diameter guide type. The fourth embodiment is the inner-diameter guide type.

Similar to the previous embodiments, the retainer of the third embodiment has a plurality of crossbars 2 arranged circumferentially at equal intervals between the pair of annular portions 1.

In this embodiment, the outer peripheral surfaces of the annular portions 1 are used as the outer-diameter guide surfaces 6. Each crossbar 2 has radially inwardly recessed stepped portions 11 at both ends, and a middle portion 15 that is further recessed from the stepped portions 11 on both sides.

Outer-diameter claws 7 protrude into the pockets 4 from the roller guide surfaces 5 at the portions where the stepped portions 11 are formed.

Inner-diameter claws 8 protrude into the pockets 4 from the roller guide surfaces 5 of the middle portion 15 of each crossbar 2. As shown in FIG. 5B, the needle rollers 3 are held in the pockets by being supported on the inner-diameter edges of the outer-diameter claws 7 and the outer-diameter edges of the inner-diameter claws 8. The outer-diameter claws 7 are retracted from the outer-diameter guide surfaces 6 by the same amount the stepped portions 11 are recessed from the outer-diameter guide surfaces 6.

In the fourth embodiment shown in FIG. 6, the inner-diameter guide surfaces 14 are formed by the inner-diameter surfaces of the annular portions 1 and part of the inner-diameter surfaces of the middle portions 15. Each middle portion 15 has a stepped portion 11' formed with the inner-diameter claws 8.

The inner-diameter claws 8 are retracted radially outwardly by the same amount as the stepped portions 11' are from the surfaces 14. Thus, they will never break oil films.

Figure 7:
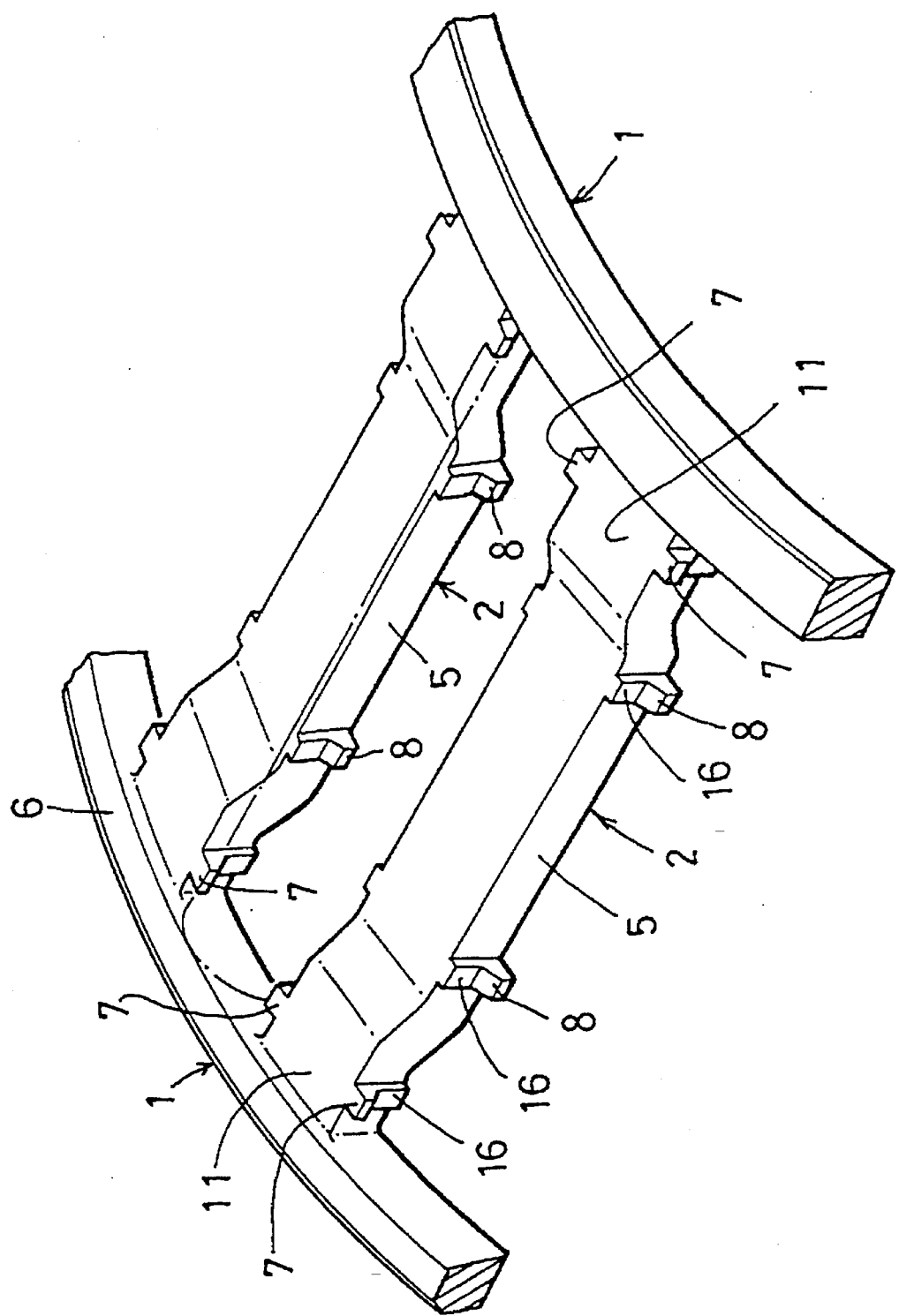
FIG. 7 is a partial enlarged perspective view of a fifth embodiment.
Figure 9:
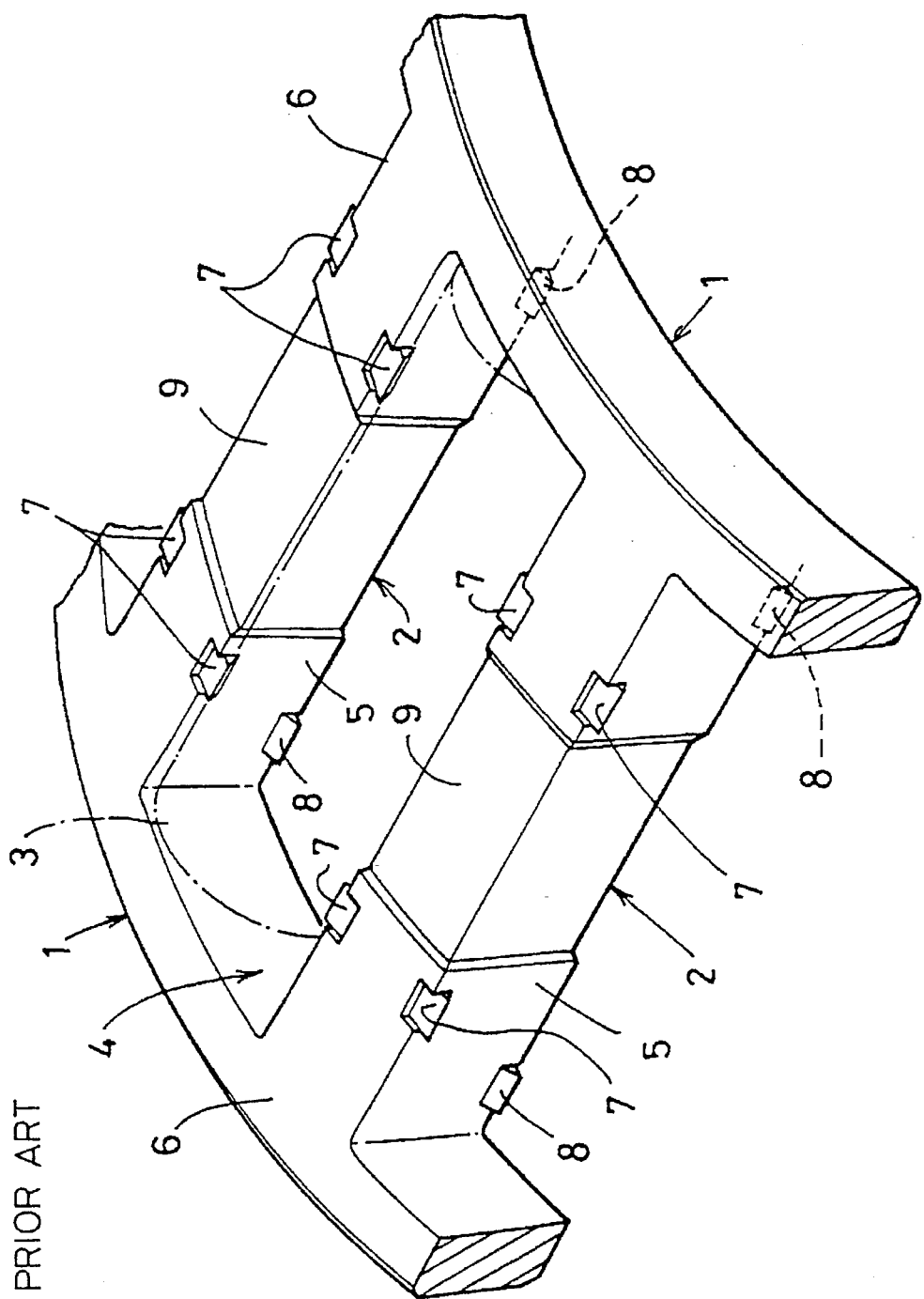
FIG. 9 is a partial enlarged perspective view of a conventional retainer.

The retainer shown in FIGS. 7 and 8 is formed by blanking a steel strip and rolling the blanked member into a cylindrical shape. It is an outer-diameter guide type retainer. Four protrusions 16 are formed on the roller guide surfaces 5 of each crossbar 2. Two of the four protrusions 16 near the annular portions 1 are ironed radially outwardly to form the outer-diameter claws 7. The other two protrusions 16 are ironed radially inwardly to form the inner-diameter claws 8.

In this embodiment, the outer-diameter surfaces of the annular portions 1 are used as the outer-diameter guide surfaces 6. Each crossbar 2 is formed with stepped portions 11 inside the outer-diameter guide surfaces 6. The outer-diameter claws 7 are formed on the roller guide surfaces 5 of the stepped portions 11.

The outer-diameter claws 7 are retracted from the outer-diameter guide surfaces 6 by the same amount as the stepped portions 11 are from the guide surfaces 6. Thus, they will never break oil films.

What is claimed is:

1. An outer-diameter guide type retainer for a roller bearing, said retainer comprising:

a first annular portion defining an outer diameter guide surface;

a second annular portion defining an outer diameter guide surface;

a plurality of crossbars extending between and connecting said first and second annular portions, said plurality of crossbars being equally circumferentially spaced so as to define a plurality of pockets for receiving a plurality of rollers, respectively, each of said crossbars having opposite faces which serve as roller guide surfaces and stepped outer diameter portions which are slightly recessed radially inwardly from said outer diameter guide surfaces such that a radial thickness of each of said crossbars is substantially the same as a radial thickness of said first and second annular portions;

a pair of outer diameter claws formed on each of said roller guide surfaces at said stepped outer diameter portion; and a pair of inner diameter claws formed on each of said roller guide surfaces, wherein said pairs of outer diameter claws and said pairs of inner diameter claws are capable of retaining the plurality of rollers in said plurality of pockets.

2. An inner-diameter guide type retainer for a roller bearing, said retainer comprising:

a first annular portion defining an inner diameter guide surface;

a second annular portion defining an inner diameter guide surface;

a plurality of crossbars extending between and connecting said first and second annular portions, said plurality of crossbars being equally circumferentially spaced so as to define a plurality of pockets for receiving a plurality of rollers, respectively, each of said crossbars having opposite faces which serve as roller guide surfaces and stepped inner diameter portions which are slightly recessed radially outwardly from said inner diameter guide surfaces such that a radial thickness of each of said crossbars is substantially the same as a radial thickness of said first and second annular portions;

a pair of outer diameter claws formed on each of said roller guide surfaces; and a pair of inner diameter claws formed on each of said roller guide surfaces at said stepped inner diameter portion, wherein said pairs of outer diameter claws and said pairs of inner diameter claws are capable of retaining the plurality of rollers in said plurality of pockets.

* * * * *